US012646044B2

(12) United States Patent
Albero et al.

(10) Patent No.: US 12,646,044 B2
(45) Date of Patent: Jun. 2, 2026

(54) CUSTOM PAYMENT TOKENS FOR PAYMENTS BY USING OPTICAL TONES AND NEUROMORPHIC SPIKING NEURAL NETWORKS

(71) Applicant: Bank of America Corporation, Charlotte, NC (US)

(72) Inventors: George Albero, Charlotte, NC (US); Naga Vamsi Krishna Akkapeddi, Charlotte, NC (US); Victor A. Hirudhayaraj, Matthews, NC (US)

(73) Assignee: Bank of America Corporation, Charlotte, NC (US)

( * ) Notice: Subject to any disclaimer, the term of this patent is extended or adjusted under 35 U.S.C. 154(b) by 253 days.

(21) Appl. No.: 18/643,413

(22) Filed: Apr. 23, 2024

(65) Prior Publication Data

US 2025/0328876 A1     Oct. 23, 2025

(51) Int. Cl.
    *G06Q 20/32*        (2012.01)
    *G06Q 20/06*        (2012.01)
          (Continued)

(52) U.S. Cl.
    CPC ....... *G06Q 20/3272* (2013.01); *G06Q 20/065* (2013.01); *G06Q 20/308* (2020.05);
          (Continued)

(58) Field of Classification Search
    CPC .............. G06Q 20/065; G06Q 20/322; G06Q 20/40145; G06Q 2220/00
          (Continued)

(56) References Cited

U.S. PATENT DOCUMENTS 9,015,093 B1    4/2015   Commons
10,219,736 B2   3/2019   Davis et al.
         (Continued)

FOREIGN PATENT DOCUMENTS

CN      108156161 A   *   6/2018   ......... H04L 63/0861
CN      117273934 A   *   12/2023   ............. G06Q 40/04
         (Continued)

OTHER PUBLICATIONS

Endpoint Audio Labs—Optical Sound Examples—https://www.endpointaudio.com/optical-sound-detail, pp. 1-4, retrieved online on Apr. 19, 2024.

(Continued)

*Primary Examiner* — Wodajo Getachew
(74) *Attorney, Agent, or Firm* — Banner & Witcoff, Ltd.

(57) ABSTRACT

Digital payment systems and methods leveraging optical tones, blockchain technology, and neuromorphic computing to enhance transaction security and flexibility are disclosed. By initiating transactions with unique optical tones generated through mobile IoT applications, payment instructions are encoded into visually encrypted signals, ensuring high security from the outset. Multi-Factor Authentication (MFA), including advanced facial recognition via Convolutional Neural Networks (CNNs), authenticates users, while Spiking Neural Networks (SNNs) process and filter the optical tones, focusing on pertinent transaction details. The system utilizes blockchain oracles and smart contracts for validating transactions and automating the execution of payment instructions, respectively. A novel aspect of this invention is the ability to generate custom payment tokens, either embedded within optical tones or as separate entities, to facilitate specific transactions. This approach not only significantly enhances the security of digital payments but also introduces unprecedented flexibility in managing finan- (Continued)

cial transactions, setting spending limits, and executing recurring payments.

20 Claims, 5 Drawing Sheets

(51) Int. Cl.

| | |
|---|---|
| *G06Q 20/30* | (2012.01) |
| *G06Q 20/40* | (2012.01) |
| *H04L 9/00* | (2022.01) |
| *G06Q 20/02* | (2012.01) |

(52) U.S. Cl.
CPC ....... *G06Q 20/322* (2013.01); *G06Q 20/3274* (2013.01); *G06Q 20/40145* (2013.01); *H04L 9/50* (2022.05); *G06Q 20/02* (2013.01); *G06Q 20/4016* (2013.01); *G06Q 2220/00* (2013.01)

(58) Field of Classification Search
USPC .......................................................... 705/65
See application file for complete search history.

(56) References Cited

U.S. PATENT DOCUMENTS

| | | | |
|---|---|---|---|
| 10,785,365 | B2 | 9/2020 | Rodriguez et al. |
| 11,486,185 | B2 | 11/2022 | Tulsidas |
| 11,494,991 | B2 | 11/2022 | Spivack et al. |
| 2002/0111869 | A1* | 8/2002 | Shuster ................ G06Q 20/203 705/22 |
| 2011/0172004 | A1 | 7/2011 | Breitenbach et al. |
| 2012/0295960 | A1 | 11/2012 | Palfi et al. |
| 2014/0108252 | A1* | 4/2014 | Itwaru ................ G06Q 20/3276 705/44 |
| 2014/0313303 | A1 | 10/2014 | Davis et al. |
| 2015/0088674 | A1* | 3/2015 | Flurscheim .......... G06Q 20/326 705/17 |
| 2018/0225640 | A1* | 8/2018 | Chapman ............. G06Q 20/401 |
| 2019/0005976 | A1* | 1/2019 | Peleg ...................... G10L 25/30 |
| 2020/0137110 | A1 | 4/2020 | Tyler et al. |
| 2021/0319452 | A1* | 10/2021 | Ramanathan ...... G06Q 20/3272 |
| 2022/0027447 | A1 | 1/2022 | Keith, Jr. |
| 2022/0028200 | A1 | 1/2022 | Keith, Jr. |
| 2022/0094550 | A1 | 3/2022 | Keith, Jr. |
| 2022/0385458 | A1 | 12/2022 | Keith, Jr. |
| 2023/0036694 | A1 | 2/2023 | Coughlan |
| 2023/0107624 | A1 | 4/2023 | Keith, Jr. |
| 2023/0114650 | A1 | 4/2023 | Keith, Jr. |

FOREIGN PATENT DOCUMENTS

| | | |
|---|---|---|
| DE | 102021209146 A1 | 3/2022 |
| DE | 102022212157 A1 | 5/2023 |
| TW | 202143136 A | 11/2021 |
| WO | 2004002103 A1 | 12/2003 |

OTHER PUBLICATIONS

ScienceDirect - Frequency Tone - https://www.sciencedirect.com/topics/engineering/frequency-tone, pp. 1-9, retrieved online on Apr. 19, 2024.

\* cited by examiner

CUSTOM PAYMENT TOKENS FOR PAYMENTS BY USING OPTICAL TONES AND NEUROMORPHIC SPIKING NEURAL NETWORKS

TECHNICAL FIELD

The invention relates to the field of digital transaction security, focusing on the development and implementation of an advanced security framework for the protection of financial transactions over digital networks. It employs a novel integration of blockchain technology, optical tones, and neuromorphic Spiking Neural Networks (SNNs) to authenticate users and validate transaction instructions in real-time, ensuring the integrity and confidentiality of the payment process. By creating a secure, immutable ledger for transaction verification and utilizing optical tones as a secure medium for initiating transactions, the invention significantly enhances the security of digital payments. Additionally, the application of neuromorphic computing models for real-time user authentication and the filtering of transactional data addresses the critical need for dynamic and robust defense mechanisms against unauthorized access, fraud, and cyber threats in the evolving landscape of digital commerce.

DESCRIPTION OF THE RELATED ART

The landscape of digital payments, while continuously evolving, still presents a myriad of challenges that have long sought robust solutions. At the forefront of these challenges is the persistent threat of security vulnerabilities. As the digital economy expands, so too does the ingenuity of cybercriminals, employing increasingly sophisticated methods such as phishing, skimming, and data breaches. These methods compromise user data, leading to unauthorized access and fraudulent transactions, sowing distrust in digital payment platforms.

In tandem with security concerns, there exists a notable deficiency in the flexibility and customization of current payment systems. Users seeking to manage ad hoc payments, particularly those that fluctuate or are non-recurring, find themselves constrained by the rigid structures of existing platforms. This limitation is acutely felt by individuals needing to impose controls over specific types of expenses or allocate funds within defined parameters, underscoring a pressing need for a more adaptable solution.

The reliance on physical payment instruments, including cash and cards, further exacerbates these issues. Physical forms of payment are not only prone to loss and theft but also contribute to a disconnect in an increasingly digital-first world. The inconvenience and risk associated with carrying and using these physical mediums underscore the growing demand for a payment solution that transcends these limitations, leveraging digital innovation for enhanced security and convenience.

Moreover, the lack of robust parental controls within existing digital payment platforms presents another significant challenge. As digital literacy and access among younger populations increase, so does the need for mechanisms that allow parents to oversee and manage their dependents' spending. The absence of effective tools for setting spending limits or monitoring transactions leaves a gap in fostering financial responsibility and safeguarding against misuse.

The management of recurring payments, especially those entailing variable amounts or shared responsibilities, is fraught with inefficiency and prone to errors. Traditional systems often fail to accommodate the nuanced requirements of users, such as alternating payment responsibilities among family members or adjusting for varying expense amounts. This inadequacy highlights the need for a more versatile and reliable mechanism for automating and managing these payments.

Additionally, the fragmented nature of the digital payment ecosystem, characterized by a multitude of platforms operating in isolation, complicates the transaction process. This fragmentation hinders seamless integration and interoperability across services, creating barriers for users who navigate multiple payment systems. The resulting complexity and inconvenience call for a unified approach that simplifies transactions and enhances user experience.

The slow adoption of blockchain technology in mainstream payment applications further amplifies these challenges. Despite its potential to revolutionize transaction security and transparency, blockchain's complexity and the scarcity of user-friendly applications have limited its integration into everyday financial transactions. This slow uptake reflects a broader issue of harnessing emerging technologies to address existing payment system deficiencies.

Transaction validation processes currently in place are often cumbersome, slow, and susceptible to error. Relying heavily on manual verification or outdated authentication methods, these processes do not meet the demands of modern, fast-paced transactions. The need for a more efficient, automated, and secure method of validation is evident, emphasizing the urgency for innovation in this area.

Environmental concerns related to the production and disposal of physical payment instruments also contribute to the challenges facing the payment industry. The environmental footprint of manufacturing, distributing, and discarding these instruments is considerable, driving the search for more sustainable alternatives. A solution that reduces or eliminates the need for physical payment mediums would represent a significant step forward in addressing these environmental impacts.

Furthermore, the demand for personalized payment solutions that cater to the unique needs and preferences of individual users is growing. The one-size-fits-all approach of many existing payment systems falls short of meeting these diverse requirements, highlighting the need for a more tailored and flexible payment experience.

In summary, the long-felt and unmet need in the digital payment space is for a solution that addresses these multifaceted challenges. A system that offers robust security measures to combat fraud, enhances flexibility and customization for managing payments, and transcends the limitations of physical payment instruments is urgently required. Additionally, such a system should provide effective parental controls, accommodate the complexities of recurring payments, and simplify the fragmented payment ecosystem through integration and interoperability. Leveraging emerging technologies like blockchain for improved validation and sustainability, while also delivering a personalized payment experience, encapsulates the comprehensive solution the industry has been seeking.

SUMMARY OF THE INVENTION

The invention presents a groundbreaking approach to digital payments, addressing a host of issues that plague current systems by leveraging a blend of optical tones, blockchain technology, and neuromorphic computing. This solution is designed to revolutionize the way transactions are conducted, authenticated, and validated, providing an unprecedented level of security and flexibility.

At the core of the invention lies the innovative use of optical tones for initiating transactions. These tones, which constitute encoded binary data in audio and/or visual form, can be generated and interpreted by devices to represent monetary values, payment instructions, or monetary or payment limitations or authorizations. Unlike traditional physical or digital payment methods, optical tones offer a unique and secure medium for conveying transaction details, significantly reducing the risk of interception or fraud.

The authentication process employed by this invention is another key feature, utilizing Convolutional Neural Networks (CNNs) and Spiking Neural Networks (SNNs). CNNs are deployed to accurately recognize and verify users based on facial recognition technology, ensuring that payment instructions are initiated by authorized individuals. SNNs, on the other hand, are used to process and filter the information contained in optical tones, removing irrelevant data, and focusing on the critical elements necessary for transaction validation.

Blockchain technology is integral to the invention, serving as the backbone for the secure recording and validation of transactions. By creating a decentralized and immutable ledger of payment instructions, the system ensures that each transaction is transparently recorded and cannot be altered or deleted. This not only enhances the security of the payment process but also provides a reliable audit trail for all parties involved.

The invention also introduces a novel method for generating custom payment tokens. These tokens are created using optical tones and can be allocated for specific uses, such as setting spending limits for dependents or facilitating recurring payments. This feature grants users unparalleled control over their finances, allowing them to designate tokens for particular expenses, categories, or individuals.

Smart contracts play a crucial role in the management of these payment tokens. Written in Solidity or equivalent programming languages for platforms like Ethereum, these contracts automate the execution of payment instructions based on the predefined conditions encoded within them. This automation streamlines the payment process, ensuring that transactions occur seamlessly and without the need for manual intervention.

One of the most compelling applications of this invention is in the realm of parental control. Parents can create payment tokens with specific values or allowances, allocating these to their children's digital wallets. This capability enables parents to set spending caps for their children, monitor their expenditures, and even restrict spending to certain categories, promoting financial responsibility.

The system's flexibility extends to the management of recurring payments as well. Users can designate tokens for regular expenses such as mortgages, utilities, or subscriptions. Smart contracts facilitate these recurring payments, deducting the appropriate amount of tokens at specified intervals and transferring them to the designated recipients.

The payment process begins with the initiation of a transaction using an optical tone, which is generated and recognized by the system. Following user authentication through CNN-based facial recognition, the SNN processes the optical tone to verify the transaction details. Subsequent validation by blockchain oracles ensures that the payment instruction is legitimate and in line with the user's intentions.

An additional layer of innovation is introduced through the integration of custom models that either embed tokens within optical tones or create bespoke tokens for specific transactions. This approach not only enhances the security of the payment process but also adds a layer of customization, allowing for the tailoring of payment instructions to meet the unique needs of each user.

Accordingly, this invention addresses a long-felt need for a more secure, flexible, and user-friendly digital payment system. By combining optical tones with blockchain technology and neuromorphic computing, it offers a novel solution that safeguards against fraud, enhances transaction efficiency, and provides users with greater control over their financial transactions. This comprehensive approach to digital payments represents a significant leap forward in the quest for a more secure, efficient, and adaptable financial ecosystem.

Considering the foregoing, the following presents a simplified summary of the present disclosure to provide a basic understanding of various aspects of the disclosure. This summary is not limiting with respect to the exemplary aspects of the inventions described herein and is not an extensive overview of the disclosure. It is not intended to identify key or critical elements of or steps in the disclosure or to delineate the scope of the disclosure. Instead, as would be understood by a personal of ordinary skill in the art, the following summary merely presents some concepts of the disclosure in a simplified form as a prelude to the more detailed description provided below. Moreover, sufficient written descriptions of the inventions are disclosed in the specification throughout this application along with exemplary, non-exhaustive, and non-limiting manners and processes of making and using the inventions, in such full, clear, concise, and exact terms to enable skilled artisans to make and use the inventions without undue experimentation and sets forth the best mode contemplated for carrying out the inventions.

In some arrangements, a system is provided for initiating and processing payment transactions using optical tones and validated through a combination of blockchain technology and neuromorphic computing. One or more process steps may include:

a. Initiation of Payment Transaction with an Optical Tone: The process begins when a user initiates a payment transaction using an optical tone. This step leverages mobile IoT applications, allowing users to create and transmit optical tones that carry encoded payment instructions.

b. Creation of Optical Tones: Users generate optical tones on devices or through a cloud application, with each tone corresponding to specific pitch labels. This is facilitated by cloud services that support optical tones, ensuring that the tones can be created, recognized, and processed effectively.

c. Authentication Using MFA: To ensure the security of the transaction, the user is authenticated using Multi-Factor Authentication (MFA). This step is crucial for verifying the identity of the user and preventing unauthorized transactions.

d. Facial Recognition Using CNN: Convolutional Neural Networks (CNN) are employed for facial recognition, adding an extra layer of security by confirming the user's identity based on their facial features.

e. Optical Tone Processing Using SNN: Spiking Neural Networks (SNN) are used to filter out irrelevant information from the optical tones. This ensures that only pertinent data related to the payment instruction is processed, enhancing the accuracy and efficiency of the system.

f. Recognition and Validation of the Tone: The system recognizes the optical tone and validates it, ensuring that it matches the intended payment instruction and is authentic.

g. Token Retrieval for the Transaction: Upon validation, the relevant token for the transaction is retrieved. This could be a network token, acquirer token, issuer token, or merchant token, depending on the transaction's requirements.

h. Custom Token Creation: A custom model is utilized to either embed the token within the optical tone using Python or create a custom token specifically for the optical tone. This step allows for a high degree of customization and flexibility in how payment instructions are encoded and transmitted.

i. Payment Instruction Transmission: The payment instruction, including any specified spending limits for dependents or instructions for recurring bill payments, is sent. This instruction is encoded within the optical tone or the custom token, ready for processing by the recipient.

j. Smart Contract Activation: Smart contracts on a financial institution's blockchain are engaged to automate the processing of the payment instruction. These contracts execute based on the encoded conditions, facilitating automatic and secure transactions.

k. Blockchain Oracle Validation: Blockchain oracles are used to validate the token and, by extension, the payment instruction. This step is critical for ensuring that the instruction is legitimate and aligns with the blockchain's recorded data and smart contracts' conditions.

l. Optional Custom Model Integration: There's an option to integrate with a custom model to segregate the optical tone token and payment token further, enhancing the system's flexibility and security.

m. Final Validation and Implementation: Finally, both the optical tone token and payment token are validated before the customer instruction is implemented. This ensures that every aspect of the transaction is secure, authenticated, and aligned with the user's intentions before any funds are transferred or payments are made.

In some arrangements, an information-security method for managing digital payment transactions involves several steps, executed using a combination of advanced technologies and secure processes. Initially, the method starts with receiving a user input via the user interface of a mobile or Internet of Things (IoT) device. This input, which specifies details such as the payment amount, recipient, or context of the transaction, triggers the generation of an optical tone. This tone encodes the transaction details into a visual or audible representation, utilizing a predetermined algorithm designed to convert these details into a machine-readable optical tone format.

Once generated, this optical tone is securely transmitted from the mobile or IoT device to a payment system server over a digital network. This transmission ensures the security of the optical tone by employing encrypted communication channels. Upon receipt of the optical tone, the payment system server authenticates the user of the device. This authentication process involves a multi-factor authentication approach that includes verifying a biometric identifier of the user through facial recognition technology. This technology, implemented via convolutional neural networks, analyzes facial features captured by the device. Additionally, a secondary authentication factor is requested and validated, which may include a password, a PIN, or another biometric input distinct from facial recognition.

Following authentication, the received optical tone is processed by a spiking neural network. This network is specifically configured to filter out irrelevant information and to extract essential transaction data, focusing on elements critical for transaction validation. The payment system server then verifies the authenticity and accuracy of the transaction details encoded in the optical tone by comparing the extracted data against predefined transaction rules stored in a database.

Based on the verified transaction details, a custom payment token is created. This token uniquely represents the transaction and involves associating the optical tone with specific transaction attributes, including the payment amount, recipient identity, and the context of the transaction. The custom payment token is then recorded in a blockchain ledger associated with the user's account, providing a decentralized, secure, and immutable record of the transaction. The token creation is recorded as a new block in the blockchain, which includes cryptographic linking to preceding blocks.

The transaction is executed based on the custom payment token through the payment system. This execution involves deducting the specified payment amount from the user's blockchain-linked account and crediting it to the recipient's account. Post-execution, the transaction is validated using blockchain oracles that independently verify the transaction's compliance with the encoded conditions within the custom payment token and the predefined rules of the blockchain network. Finally, the user's account in the blockchain ledger is updated in real-time to reflect the completed transaction, including marking the custom payment token as utilized and recording the transaction outcome. This comprehensive method ensures enhanced security and efficiency in digital payment transactions.

In some arrangements, an additional feature includes displaying a confirmation prompt on the user interface of the mobile or IoT device after the optical tone has been generated. This confirmation prompt requires the user to verify or edit the transaction details before the optical tone is transmitted, ensuring that all transaction details are accurate and authorized by the user before proceeding.

Enhancing the security measures further, the method of transmitting the optical tone involves employing a secure session initiation protocol (SIP). This protocol establishes a verified connection between the mobile or IoT device and the payment system server prior to transmitting the optical tone, thereby securing the data transfer against potential interceptions, and ensuring the integrity of the transmitted data.

In the realm of user authentication, the method specifies that the biometric identifier for facial recognition is captured using a high-definition camera integrated into the mobile or IoT device. The captured facial features are processed in real-time to generate a facial recognition template, which is used to verify the identity of the user, ensuring that the transaction is being initiated by a legitimate and authorized user.

Further enhancing user authentication, the method includes a secondary authentication factor that involves receiving a voice command as a biometric input. This voice command is analyzed using advanced voice recognition algorithms to confirm the identity of the user, adding an additional layer of security to the authentication process.

Regarding the processing of the optical tone, the method involves the application of a noise reduction algorithm by the spiking neural network. This algorithm enhances the clarity and accuracy of the data extracted from the optical tone, ensuring that the essential transaction data is precise and reliable for further processing and validation.

To bolster fraud detection, the method includes a step where the transaction details verified involve checking the extracted data against a list of known fraud indicators stored on the payment system server. This step significantly enhances the security measures by proactively identifying and mitigating potentially fraudulent activities.

In terms of optical tone security, one method ensures that each optical tone generated is unique and is not reused for any other transaction. This approach provides enhanced security by preventing the replication and reuse of optical tones in fraudulent transactions, thereby safeguarding the transaction process. In other methods or arrangements, the same optical tone may be used for limited time intervals or changed on demand as desired as opposed to using a unique optical tone each new transaction.

During the recording of the custom payment token in the blockchain ledger, the method includes tagging the token with a timestamp and geographic location data from where the transaction was initiated. This tagging helps in the traceability and verification of the transaction, providing a detailed record that enhances security and accountability.

The method can involve notifying the user via the mobile or IoT device about the successful recording and validation of the transaction in the blockchain ledger. The notification includes details of the transaction and a cryptographic hash of the block containing the transaction record, providing transparency and reassurance to the user about the security and successful processing of their transaction.

In some arrangements, an information-security system is designed for managing digital payment transactions with a comprehensive suite of modules tailored to ensure security and efficiency. The system comprises a user interface module that is adept at receiving user inputs and displaying transaction details on a mobile or Internet of Things (IoT) device. Integrated into the system is an optical tone generator module, which encodes transaction details into optical tones, each tone uniquely representing transaction attributes such as payment amount, recipient, or context.

For secure communication, the system includes a communication module configured to transmit the encoded optical tones to a payment system server via encrypted communication channels, safeguarding the data during transfer. The authentication module incorporates facial recognition technology implemented through convolutional neural networks along with a multi-factor authentication process to verify the identity of users, ensuring that transactions are initiated by authorized individuals.

Additionally, a spiking neural network module processes the received optical tones by filtering out irrelevant information and extracting essential transaction data. This processed data is then authenticated by a verification module located on the payment system server, which compares the data against predefined transaction rules to ensure its accuracy and authenticity.

The system also features a token generation module that creates custom payment tokens based on the verified transaction details. Each token is recorded in a blockchain ledger, providing a secure and immutable record of the transaction. Transactions are executed through a transaction execution module that uses these custom payment tokens to perform transactions and update the user's blockchain-linked account accordingly.

To further enhance security, a blockchain module validates the transactions by verifying compliance with the encoded conditions in the custom payment tokens and the predefined rules of the blockchain. Finally, an update module is responsible for updating the blockchain ledger in real-time to reflect the transaction outcome, including marking the tokens as utilized. This comprehensive system architecture ensures that digital payment transactions are conducted securely, efficiently, and transparently.

In some arrangements, the user interface module in the information-security system has enhanced functionality to provide both visual and audible confirmation prompts. These prompts are designed to require user verification of transaction details before the optical tone is transmitted. This feature ensures that the user confirms the accuracy and intention of the transaction, enhancing security by preventing unintentional or fraudulent transactions.

The communication module can include a secure session initiation protocol (SIP) manager. This manager is responsible for establishing a verified and secure connection between the mobile or IoT device and the payment system server. This connection ensures that the data transmitted, specifically the optical tones, are securely communicated without interception, maintaining the integrity and confidentiality of the transaction data.

The authentication module can be equipped with a high-definition camera to capture facial features for facial recognition accurately. Additionally, this module includes a voice recognition subsystem that is used to receive and analyze voice commands. These features are integral parts of the multi-factor authentication process, providing a robust verification mechanism that enhances user identity security.

The spiking neural network module can incorporate a noise reduction processor. This processor is specifically designed to enhance the clarity and accuracy of the data extracted from optical tones. By reducing noise and potential data corruption, this module ensures that only relevant and clear transaction data is processed for authentication and verification.

The verification module can include a fraud detection analyzer. This analyzer is configured to scrutinize the extracted data against a list of known fraud indicators. This capability significantly enhances the security measures of the system, allowing for the early detection and prevention of fraudulent activities, thereby safeguarding the integrity of the transaction process.

The optical tone generator module can be configured to ensure that each optical tone generated is unique and not reused for any other transaction. This functionality enhances transaction security by preventing the replication and misuse of optical tones, a critical feature that helps thwart potential fraud and unauthorized transaction attempts.

The token generation module can include a mechanism for geographic and temporal tagging. This mechanism tags each custom payment token with a timestamp and geographic location data from where the transaction was initiated. This tagging provides an additional layer of security and traceability, offering valuable context for each transaction and enhancing the overall security framework.

The update module can be configured to send notifications to the user's mobile or IoT device upon the successful completion of a transaction. These notifications include detailed transaction information and a cryptographic hash of the block containing the transaction record. This feature ensures that users are promptly and securely informed about the status of their transactions, providing transparency, and reinforcing trust in the system's security measures.

In some arrangements, a method for enhancing security and efficiency in digital payment transactions involves a series of meticulously designed steps, all orchestrated to ensure the highest level of transaction integrity and user authentication. The process begins when a user initiates a transaction through their device by inputting critical transaction details such as the payment amount and recipient information. Subsequently, a unique optical tone is generated, which encodes these transaction details. This optical tone is crafted using a specialized algorithm that translates the details into a secure visual and/or audible format, ensuring the encoded data is protected from unauthorized access.

Following the generation of the optical tone, it is transmitted from the user's device to a payment system server via a secure, encrypted communication channel. This ensures that the sensitive data remains confidential throughout its transit. Upon receipt, the server undertakes the task of authenticating the identity of the user who initiated the transaction. This authentication involves a multi-factor system that includes real-time facial recognition facilitated by convolutional neural networks, which analyze captured facial features of the user. Additionally, a secondary layer of authentication is implemented, requiring the user to input a security code or perform a biometric action distinct from the facial recognition, further strengthening the security measures.

Once authenticated, the optical tone undergoes processing at the payment system server. A spiking neural network, specifically configured for this purpose, extracts essential transaction details by filtering out non-essential information. This focuses the validation process on data critical for transaction integrity. The extracted transaction details are then scrutinized for authenticity and accuracy against a predefined set of security rules to identify any potential fraud or discrepancies.

Upon successful verification, a custom payment token is generated. This token, which uniquely represents the transaction within a blockchain system, encapsulates the authenticated and verified transaction details. The token and the transaction are recorded in a blockchain ledger, which ensures that the transaction is documented immutably and securely, with comprehensive details including the transaction amount, recipient, and timestamp.

Validation of the transaction is conducted through blockchain oracles, which verify that the transaction adheres to the blockchain network rules, and the specific conditions encoded within the custom payment token. Finally, the transaction is completed by updating the user's account in the blockchain ledger. This update involves deducting the specified amount and confirming the transaction completion with a notification sent to the user's device, thereby closing the transaction loop with transparency and security.

The following description and the appended claims, with reference to the accompanying drawings, which all form a part of this specification and where like reference numerals designate corresponding parts in the various figures, will make these and other features and characteristics of the current technology, as well as the methods of operation and functions of the related elements of structure and the combination of parts and economies of manufacture, more apparent. As computer-executable instructions (or as computer modules or in other computer constructs) recorded on computer-readable media, one or more of the different procedures or processes described herein may be implemented in whole or in part. Steps and functionality might be carried out on a single machine or dispersed over several devices that are connected to one another. However, it is clearly recognized that the drawings are meant primarily for descriptive and illustrative purposes and are not meant to define the boundaries of the invention. Unless the context makes it obvious otherwise, the single forms of "a," "an," and "the" as they appear in the specification and claims include plural referents.

DETAILED DESCRIPTION

Figure 1:
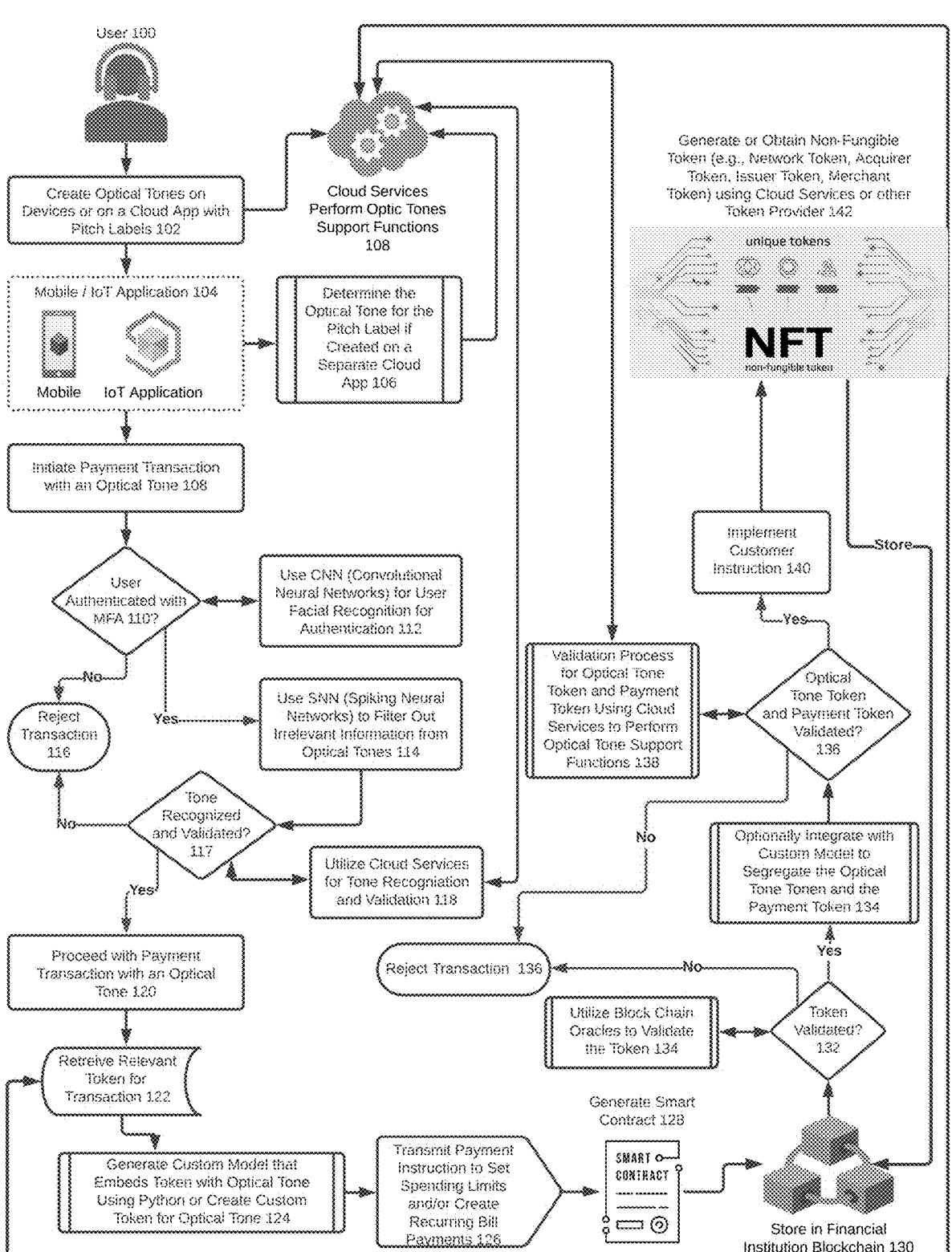
FIG. 1 depicts a flow diagram that integrates optical tones with blockchain technology and neuromorphic computing for secure and flexible transactions, and shows sample interactions, interfaces, steps, functions, and components in accordance with one or more information security aspects of this disclosure.

At a high level, the disclosed innovative digital payment systems and methods revolutionize the way transactions are made by introducing a secure and flexible mechanism that leverages optical tones, blockchain technology, and neuromorphic computing models. At its core, the invention utilizes optical tones to initiate payment transactions. These tones, encoded with transaction details, provide a novel method for conveying payment instructions, enhancing security beyond traditional methods by making the data harder to intercept and replicate.

The authentication process is another cornerstone of the invention, employing Convolutional Neural Networks (CNNs) for accurate user identification through facial recognition, and Spiking Neural Networks (SNNs) for processing the optical tones. This dual-layer authentication ensures that each transaction is initiated by a verified user and that the transaction data is relevant and secure.

Blockchain technology is integral to the invention, serving as the infrastructure for recording and validating transactions. By creating a decentralized ledger, the system ensures transparency and immutability of payment records, significantly reducing the possibility of fraudulent activities. This is further enhanced by the use of smart contracts on platforms like Ethereum, which automate the execution of payment instructions based on pre-set conditions, streamlining the process, and reducing the potential for human error.

A unique feature of this system is its ability to generate custom payment tokens through optical tones, which users can allocate for specific purposes such as setting spending controls or facilitating recurring payments. This functionality not only provides users with unprecedented control over their financial transactions but also introduces a level of customization that caters to individual needs and preferences.

The invention's application in managing allowances and spending caps, particularly for parents and guardians, represents a significant advancement. By allowing the creation of payment tokens with predefined limits, it empowers users to manage their finances more effectively, promoting responsible spending habits. Additionally, its capacity to handle recurring payments through smart contracts simplifies the management of regular financial commitments, making it an invaluable tool for modern financial management.

In essence, this invention addresses the need for a more secure, efficient, and flexible digital payment system. By combining cutting-edge technologies such as optical tones, blockchain, and neuromorphic computing, it offers a comprehensive solution that enhances the security and functionality of digital transactions, paving the way for a new era in financial technology.

The following account of various example embodiments is designed to fulfill the objectives mentioned earlier, with reference to the accompanying illustrations that are relevant to this disclosure. These illustrations demonstrate multiple systems and methods for implementing the disclosed information. It is important to acknowledge that there are alternative implementations possible, and adjustments to both structure and functionality can be applied. The description outlines various links between elements, which are to be interpreted broadly. Unless specified otherwise, these connections can be either direct or indirect, and may be established through wired or wireless means. This document does not intend to limit the nature of these connections.

Terms like "computers," "machines," and similar phrases are interchangeably used herein, depending on the context, to refer to devices that can be general-purpose or specialized, designed for particular functions, either virtual or physical, or capable of connecting to networks. This includes all relevant hardware, software, and components familiar to those with expertise in the area. Such devices may be outfitted with specialized circuits like application-specific integrated circuits (ASICs), microprocessors, cores, or other processing units to execute, access, control, or implement various types of software, instructions, data, modules, processes, or routines as mentioned. The usage of these terms in the text is not intended to be limiting or exclusive to any specific kinds of electronic devices or components and should be interpreted in the widest sense by those with relevant expertise. Specific details on computer/software components, machines, etc., are not provided for the sake of brevity and under the assumption that such information is within the realm of understanding of skilled professionals in the domain.

Software, executable code, data, modules, procedures, and similar components can be housed on tangible, computer-readable physical storage devices. This encompasses everything from local memory and network-attached storage to diverse forms of memory that are accessible, whether they are removable, remote, cloud-based, or available via other channels. These components can be saved on both volatile and non-volatile memory and might operate under various conditions, including autonomously, upon request, according to a predetermined schedule, spontaneously, proactively, or in response to specific triggers. They can be stored together or distributed among several computers or devices, incorporating their memory and other parts. Moreover, these components can be housed or disseminated across network-accessible storage systems, within distributed databases, big data frameworks, blockchains, or distributed ledger technologies, either collectively or through distributed arrangements.

The phrase "networks" or similar terms refer to a broad range of communication systems, such as local area networks (LANs), wide area networks (WANs), the Internet, cloud-based networks, and both wired and wireless networks. This category also includes specialized networks like digital subscriber line (DSL) networks, frame relay networks, asynchronous transfer mode (ATM) networks, and virtual private networks (VPN), which may be interconnected in various ways. Networks are designed with specific interfaces to support different types of communications—internal, external, and managerial—with the capability to allocate virtual IP addresses (VIPs) to these interfaces as necessary. The architecture of a network is built upon an array of hardware and software elements. This includes, but is not limited to, access points, network adapters, buses, both wired and wireless ethernet adapters, firewalls, hubs, modems, routers, and switches, which may be positioned within the network, on its periphery, or outside. Software and executable instructions work on these components to enable network operations. Additionally, networks support HTTPS and a variety of other communication protocols, making them suitable for packet-based data transmission and communication.

As used herein, Generative Artificial Intelligence (AI) or the like refers to AI techniques that learn from a representation of training data and use it to generate new content that is similar to or inspired by existing data. Generated content may include human-like outputs such as natural language text, source code, images/videos, and audio samples. Generative AI solutions typically leverage open-source or vendor sourced (proprietary) models, and can be provisioned in a variety of ways, including, but not limited to, Application Program Interfaces (APIs), websites, search engines, and chatbots. Most often, Generative AI solutions are powered by Large Language Models (LLMs) which were pre-trained on large datasets using deep learning with over 500 million parameters and reinforcement learning methods. Any usage of Generative AI and LLMs is preferably governed by an Enterprise AI Policy and an Enterprise Model Risk Policy.

Generative artificial intelligence models have been evolving rapidly, with various organizations developing their own versions. Sample generative AI models that can be used in accordance with various aspects of this disclosure include but are not limited to: (1) OpenAI GPT Models: (a) GPT-3: Known for its ability to generate human-like text, it's widely used in applications ranging from writing assistance to conversation. (b) GPT-4: An advanced version of the GPT series with improved language understanding and generation capabilities. (2) Meta (formerly Facebook) AI Models—Meta LLaMA (Language Model Meta AI): Designed to understand and generate human language, with a focus on diverse applications and efficiency. (3) Google AI Models: (a) BERT (Bidirectional Encoder Representations from Transformers): Primarily used for understanding the context of words in search queries. (b) T5 (Text-to-Text Transfer Transformer): A versatile model that converts all language problems into a text-to-text format. (4) DeepMind AI Models: (a) GPT-3.5: A model similar to GPT-3, but with further refinements and improvements. (b) AlphaFold: A specialized model for predicting protein structures, significant in the field of biology and medicine. (5) NVIDIA AI Models—Megatron: A large, powerful transformer model designed for natural language processing tasks. (6) IBM AI Models—Watson: Known for its application in various fields for processing and analyzing large amounts of natural language data. (7) XLNet: An extension of the Transformer model, outperforming BERT in several benchmarks. (8) GROVER: Designed for detecting and generating news articles, useful in understanding media-related content. These models represent a range of applications and capabilities in the field of generative AI. One or more of the foregoing may be used herein as desired. All are considered to be within the sphere and scope of this disclosure.

Generative AI and LLMs can be used in various aspects of this disclosure performing one or more various tasks, as desired, including: (1) Natural Language Processing (NLP): This involves understanding, interpreting, and generating human language. (2) Data Analysis and Insight Generation: Including trend analysis, pattern recognition, and generating predictions and forecasts based on historical data. (3) Information Retrieval and Storage: Efficiently managing and accessing large data sets. (4) Software Development Lifecycle: Encompassing programming, application development, deployment, along with code testing and debugging. (5) Real-Time Processing: Handling tasks that require immediate processing and response. (6) Context-Sensitive Translations and Analysis: Providing accurate translations and analyses that consider the context of the situation. (7) Complex Query Handling: Utilizing chatbots and other tools to respond to intricate queries. (8) Data Management: Processing, searching, retrieving, and utilizing large quantities of information effectively. (9) Data Classification: Categorizing and classifying data for better organization and analysis. (10) Feedback Learning: Processes whereby AI/LLMs improve performance based on feedback it receives. (Key aspects can include, for example, human feedback, Reinforcement Learning, interactive learning, iterative improvement, adaptation, etc.). (11) Context Determination: Identifying the relevant context in various scenarios. (12) Writing Assistance: Offering help in composing human-like text for various forms of writing. (13) Language Analysis: Analyzing language structures and semantics. (14) Comprehensive Search Capabilities: Performing detailed and extensive searches across vast data sets. (15) Question Answering: Providing accurate answers to user queries. (16) Sentiment Analysis: Analyzing and interpreting emotions or opinions from text. (17) Decision-Making Support: Providing insights that aid in making informed decisions. (18) Information Summarization: Condensing information into concise summaries. (19) Creative Content Generation: Producing original and imaginative content. (20) Language Translation: Converting text or speech from one language to another.

By way of non-limiting disclosure, FIG. 1 shows, at a high level, a flow diagram outlining a sophisticated payment system that integrates optical tones with blockchain technology and neuromorphic computing for secure and flexible transactions. It starts with the initiation of a payment transaction through an optical tone, generated via mobile IoT applications. This tone carries encrypted payment instructions. Users are authenticated using Multi-Factor Authentication (MFA), including facial recognition through Convolutional Neural Networks (CNNs). Spiking Neural Networks (SNNs) then process the optical tone, filtering out irrelevant information and focusing on essential transaction details.

The system recognizes and validates the optical tone, retrieving the appropriate transaction token (e.g., network, acquirer, issuer, or merchant token). A custom model may embed this token within the optical tone or create a specific token for it. Payment instructions, including spending limits for dependents or recurring bill payments, are sent through this secure method. Smart contracts on the blockchain automate the execution of these instructions, while blockchain oracles validate the tokens to ensure transaction integrity. An optional integration allows for further segregation of the optical tone and payment tokens, ensuring comprehensive validation before implementing the customer's instruction, thus enhancing the transaction's security and flexibility.

More specifically, FIG. 1 provides an intricate and comprehensive depiction of a digital payment system, meticulously detailing the processes involved in executing transactions using optical tones and blockchain technology, supported by advanced neural network algorithms. Each step in the diagram is carefully numbered to guide through the transaction process, highlighting the system's complexity and the depth of its technological integration.

Starting at the beginning of the process, User [100] initiates the transaction, which forms the foundation of the system's user interaction. The user utilizes either a personal device or a cloud-based application to Create Optical Tones on Devices or on a Cloud App with Pitch Labels [102]. This step involves encoding detailed payment instructions into an audio, image, and/or video format (optical tones) that can be securely transmitted and interpreted. Pitch labels are alphabetic or alphanumeric characters used to denote specific audio pitches. The most common system for pitch labeling is the use of letters from A to G, which correspond to the seven natural notes on a scale. Additional symbols or letters can denote alterations such as sharps ($\sharp$) or flats ($\flat$), and octaves. Sample systems for pitch labeling include scientific pitch notation, Helmholtz pitch notation, and MIDI note numbers.

Scientific Pitch Notation is a widely employed method for labeling pitches in Western music, utilizing letters A through G, which can be followed by a sharp or flat, and a numerical value to denote the octave. For instance, Middle C in this system is denoted as C4. Another pitch labeling system, primarily used in academic settings, is the Helmholtz Pitch Notation. This system uses a mix of capital and lowercase letters, along with additional symbols, to specify the octave; here, Middle C is indicated as c'. In the realm of electronic music and digital audio workstations, pitches are commonly labeled using MIDI note numbers, which range from 0 to 127. In this context, Middle C is typically referred to by the MIDI note number 60. These systems provide structured methods to identify and work with musical pitches in various musical and technological contexts. The ability to create these tones on a variety of devices underscores the system's versatility and user-friendliness.

Optical tones can be generated, for example, by using a combination of optical and electronic components to manipulate a continuous wave (CW) laser beam in a way that stabilizes its frequency output through various processes including filtering and self-injection locking mechanisms. In more technical terms, the optical tone can be derived from a laser beam that has been frequency-stabilized by locking it to an optical resonator through an optical filter. This filter ensures that only light at the laser carrier frequency is directed back into the laser, stabilizing, and defining the optical tone. This process can use nonlinear optical materials within the resonator to interact with the laser beam, creating a controlled and stable output that can be used in various applications requiring precise optical frequencies.

Subsequently, the system may need to Determine the Optical Tone for the Pitch Label if Created on a Separate Cloud App [106]. This step ensures that the optical tone used matches the specific pitch label assigned during the creation process, which categorizes the transaction according to type or value, enhancing the security and specificity of the transaction handling.

Optical tones to create pitch labels can refer to the use of audio and/or visually encoded data (optical tones) to represent specific information-termed as "pitch labels" in this context. In the payment system described in the invention, optical tones can function similarly to QR codes or other types of barcodes, but they encode information in a unique way that is termed as creating "pitch labels." Here, "pitch" could metaphorically represent different levels or types of information.

In practical terms, this can mean that different optical tones are used to indicate different payment amounts, transaction types, or security levels. Each variation in the optical tone could represent a different "pitch," analogous to how different pitches in sound frequencies represent different audio tones. These pitch labels would thus help categorize or specify the details of each transaction within the system, ensuring that the optical tone scanned corresponds to a particular type of transaction or instruction set.

Essentially, using optical tones to create pitch labels allows for a sophisticated, visually based method of encoding and retrieving data that is specifically designed to facilitate quick, secure, and categorized payment instructions in a digital payment system. This approach leverages the visual nature of the data for ease of use while maintaining security through unique encoding techniques.

The Mobile/IoT Application [104] is a key component, indicating that the system is designed to be used across mobile and IoT devices, thereby enhancing accessibility and convenience for users who operate in a highly mobile and connected environment.

As the user Initiates Payment Transaction with an Optical Tone [108], this marks the transaction's start within the system's framework, formally setting the entire process into motion. The involvement of Cloud Services to Perform Optic Tones Support Functions [108] illustrates the backend support necessary for managing and supporting the optical tones, ensuring they are processed accurately and efficiently.

For security, the Use of CNN (Convolutional Neural Networks) for User Facial Recognition for Authentication [112] provides a robust method for verifying the identity of the user, utilizing advanced image processing techniques to ensure that the transaction is initiated by the rightful user. This is paired with multi-factor authentication checks [110] to add an extra layer of security, confirming the user's identity through multiple independent means.

At the decision point Tone Recognized and Validated [117], the system assesses whether the optical tone is correct and valid. If it passes this check, it moves forward; if not, the transaction is rejected [116], preventing any unauthorized or malformed transaction attempts from progressing.

Upon successful validation, Utilizing Cloud Services for Tone Recognition and Validation [118] double checks the tone's integrity. This step maintains the transaction's security by ensuring that the optical tone fully corresponds to the intended payment instruction.

The system then progresses to Retrieving the Relevant Token for Transaction [122], which involves identifying and obtaining the appropriate digital token that corresponds to the transaction. The versatility of token types, as elaborated in Generate or Obtain Non-Fungible Token [142], highlights the system's capability to handle various transaction requirements through different token forms, such as network, acquirer, issuer, or merchant tokens.

To securely embed transaction details within the optical tone, Generate Custom Model that Embeds Token with Optical Tone Using Python or Create Custom Token for Optical Tone [124] provides a mechanism for dynamically customizing the transaction tokens, adding a layer of security and flexibility.

The transaction instructions, including Transmit Payment Instruction to Set Spending Limits and/or Create Recurring Bill Payments [126], are then transmitted. This functionality allows users to specify detailed instructions on how the transaction should be handled, whether setting spending limits for security or scheduling payments for convenience.

Further securing and automating the transaction, the system Generates Smart Contract [128] and Stores in Financial Institution Blockchain [130]. These steps ensure that the transaction is not only recorded in a secure, immutable ledger but also governed by smart contracts that automate the execution based on predefined rules, enhancing both security and efficiency.

A final check in the Validation Process for Optical Tone Token and Payment Token Using Cloud Services [138] ensures that both the optical tone and the payment tokens are thoroughly validated. Successful validation [136] leads to Implementing Customer Instruction [140], where the system executes all specified actions, completing the transaction securely and accurately. If validation fails, the transaction is rejected [136] to maintain the integrity of the financial system.

An optional step allows for Optionally Integrating with Custom Model to Segregate the Optical Tone Token and the Payment Token [134]. This step offers additional customization and security by separating the components of the transaction for independent handling and verification, providing an extra layer of security and flexibility.

This description of FIG. 1 encapsulates the sophisticated mechanisms and sequences involved in one example of the disclosed digital payment system, demonstrating a sample secure and dynamic process from transaction initiation to completion, all underpinned by advanced technological integrations and security measures.

Figure 2:
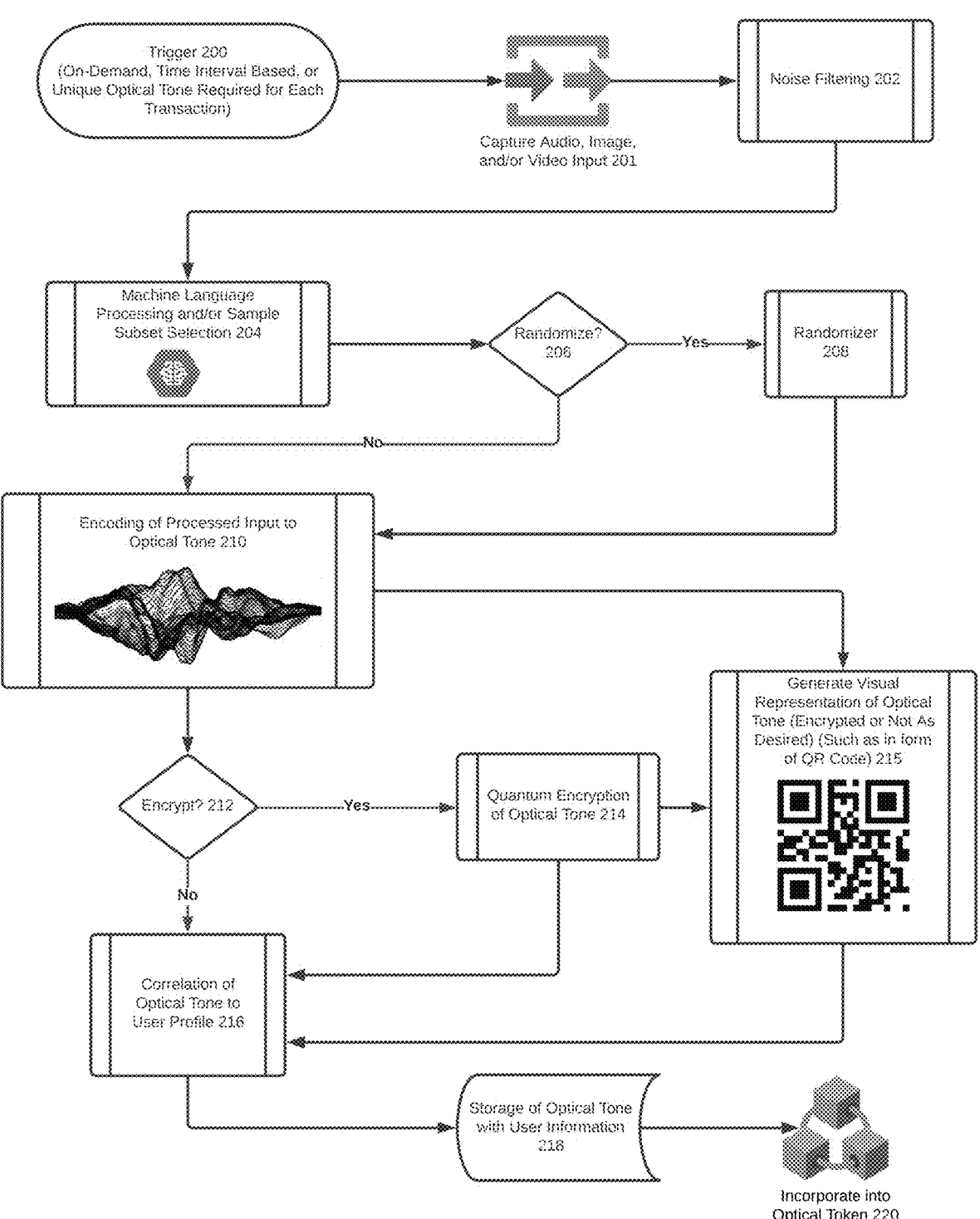
FIG. 2 depicts a sample generation of an optical tone like used in FIG. 1 in accordance with one or more information-security aspects of this disclosure.

By way of non-limiting disclosure, FIG. 2, illustrates a sophisticated process flow diagram which details the steps involved in capturing, processing, and securing user inputs to generate an optical tone, which is then utilized in transactions. This diagram details a sequence of operations that include various technological implementations to enhance security and efficiency.

Starting the process, Trigger [200] initiates the sequence, which could be activated on-demand, at a specific time interval, or under a condition that a unique optical tone is required for each transaction. This flexibility allows for dynamic response based on the system's requirements and user interaction.

Next, Capture Audio, Image, and/or Video Input [201] represents the first step in collecting input data. This could include a variety of media such as audio clips, photographs, or videos, which are essential components for creating a user profile or for transaction authentication.

The captured inputs are then passed through Noise Filtering [202] where any irrelevant or extraneous background noises or visual disturbances are removed. This ensures that only pertinent data is processed, increasing the accuracy and reliability of subsequent steps.

Following noise filtering, Machine Language Processing and/or Sample Subset Selection [204] is applied. This step involves advanced machine learning algorithms to analyze and select relevant pieces of the input data for further processing. This could entail identifying key features or frames from video, critical snippets from audio, or significant elements from images. This can be utilized to appropriately size the optical tone to a standardize number of bytes of information and/or data structure.

A decision point, Randomize [206], then determines whether the selected data subset should undergo a randomization process. If "Yes," the data moves to Randomizer [208], which applies a random transformation to the data, enhancing security by making the output less predictable and more resistant to tampering or unauthorized decryption.

Following randomization, another decision point Encrypt [212] asks whether the data should be encrypted. If affirmative, the data proceeds to Quantum Encryption of Optical Tone [214], which applies quantum cryptography techniques to ensure that the data is secured with cutting-edge encryption technology, vastly increasing the difficulty for unauthorized parties to decrypt the information. The use of quantum computing enables large blocks of data to be processed and encrypted/decrypted quickly.

Encoding of Processed Input to Optical Tone [210] follows, where the selected and possibly randomized and encrypted input data is encoded into an optical tone. This encoding transforms the data into a visual or optical format such as a QR code, making it suitable for easy scanning and recognition by digital devices.

In Generate Visual Representation of Optical Tone [215], the encoded data is formatted into a visually recognizable form, typically a QR code. This visual representation can be encrypted or not, depending on the previous encryption decision, and is ready for use in transactions or further processing.

Correlation of Optical Tone to User Profile [216] links the newly created optical tone to the user's profile. This correlation is crucial for personalizing the tone to the user's identity, ensuring that the optical tone can be authenticated and traced back to the correct user profile during transactions.

Storage of Optical Tone with User Information [218] involves securely storing the optical tone alongside relevant user information, ensuring that it is available for future transactions and can be quickly accessed and verified against user authentication requests.

Finally, Incorporate into Optical Token [220] completes the process, where the optical tone is integrated into an optical token. This token can then be used as a secure digital credential for authorizing transactions, encapsulating all the processed and secured data into a convenient and secure format ready for transactional use.

Overall, FIG. 2 provides a detailed roadmap of sample steps required to securely capture, process, and utilize user inputs to create highly secure optical tones for transactions, employing advanced technologies like machine learning, randomization, and quantum encryption to enhance security and user-specific customization.

Figure 3:
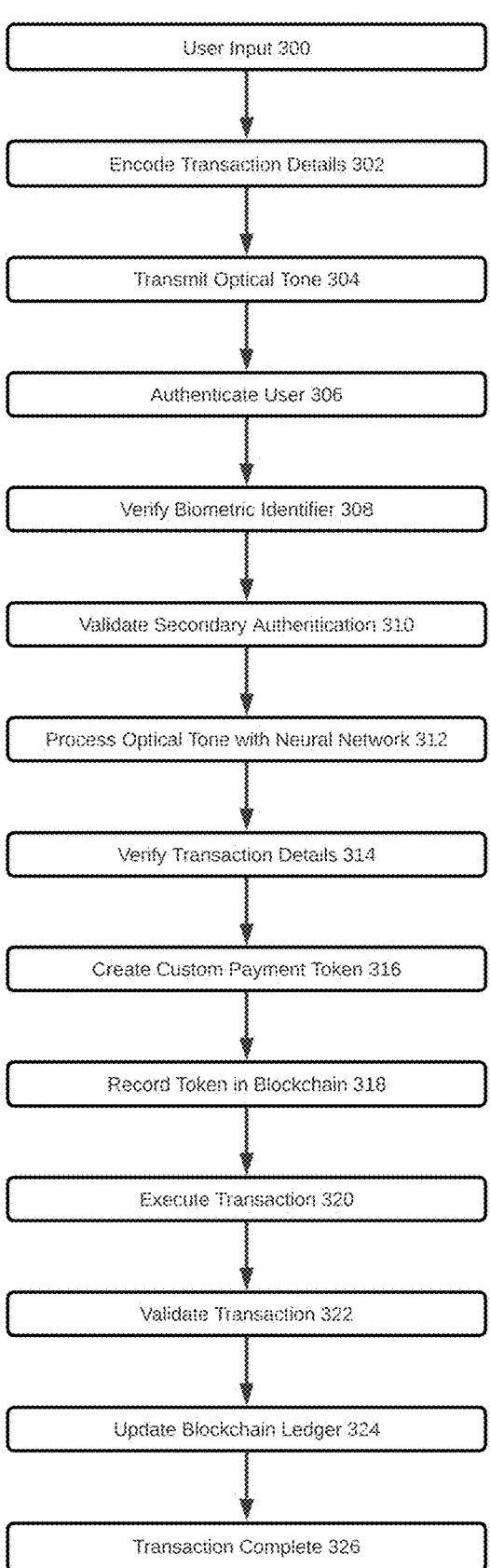
FIG. 3 depicts a sample visual representation of an information-security method for managing digital payment transactions.

By way of non-limiting disclosure, FIG. 3 provides a detailed visual representation of an information-security method for managing digital payment transactions, outlining sample steps of the process from initiation to completion.

User Input (300): The process begins with a user inputting transaction details via a user interface on a mobile or IoT device. This step involves specifying transaction parameters such as the payment amount, recipient information, or payment context, initiating the transaction process.

Encode Transaction Details (302): Following the user input, transaction details are encoded into an optical tone. This encoding utilizes a specialized algorithm designed to convert the transaction details into a machine-readable optical tone format, which can be either visual or audible.

Transmit Optical Tone (304): The optical tone generated is securely transmitted from the user device to a payment system server via encrypted communication channels, ensuring the security of the data as it moves across the digital network.

Authenticate User (306): Upon receiving the optical tone, the payment system server authenticates the identity of the user. This authentication includes multiple facets:

Verify Biometric Identifier (308): Utilizing facial recognition technology implemented via convolutional neural networks, the system analyzes facial features captured in real-time from the user's device.

Validate Secondary Authentication (310): A secondary authentication factor is requested and validated, which may include a password, a PIN, or another biometric input distinct from the facial recognition.

Process Optical Tone with Neural Network (312): The spiking neural network processes the received optical tone, filtering out irrelevant information and extracting essential transaction data. This neural network is specially configured to prioritize data elements that are critical for the validation of the transaction.

Verify Transaction Details (314): The payment system server verifies the authenticity and accuracy of the transaction details encoded in the optical tone by comparing the extracted data against predefined transaction rules stored in a database.

Create Custom Payment Token (316): Based on the verified transaction details, a custom payment token is created. This token uniquely represents the transaction and associates the optical tone with specific transaction attributes including the payment amount, the recipient identity, and the transaction context.

Record Token in Blockchain (318): The custom payment token is recorded in a blockchain ledger associated with the user's account. This ledger provides a decentralized, secure, and immutable record of the transaction. The creation of the token is recorded as a new block in the blockchain, which includes cryptographic linking to preceding blocks.

Execute Transaction (320): The transaction is executed based on the custom payment token through the payment system. This execution involves deducting the specified payment amount from the user's blockchain-linked account and crediting it to the recipient's account.

Validate Transaction (322): Post-execution, the transaction is validated using blockchain oracles that independently verify the transaction's compliance with the encoded conditions within the custom payment token and the predefined rules of the blockchain network.

Update Blockchain Ledger (324): The user's account in the blockchain ledger is updated in real-time to reflect the completed transaction. This update includes marking the custom payment token as utilized and recording the transaction outcome.

Transaction Complete (326): The process concludes with the transaction being successfully completed, with all necessary verifications and updates reflected in the system.

Thus, FIG. 3 effectively illustrates the steps involved in securing and managing digital payment transactions, highlighting the integration of advanced technologies such as blockchain, neural networks, and biometric authentication to enhance security and efficiency.

Figure 4:
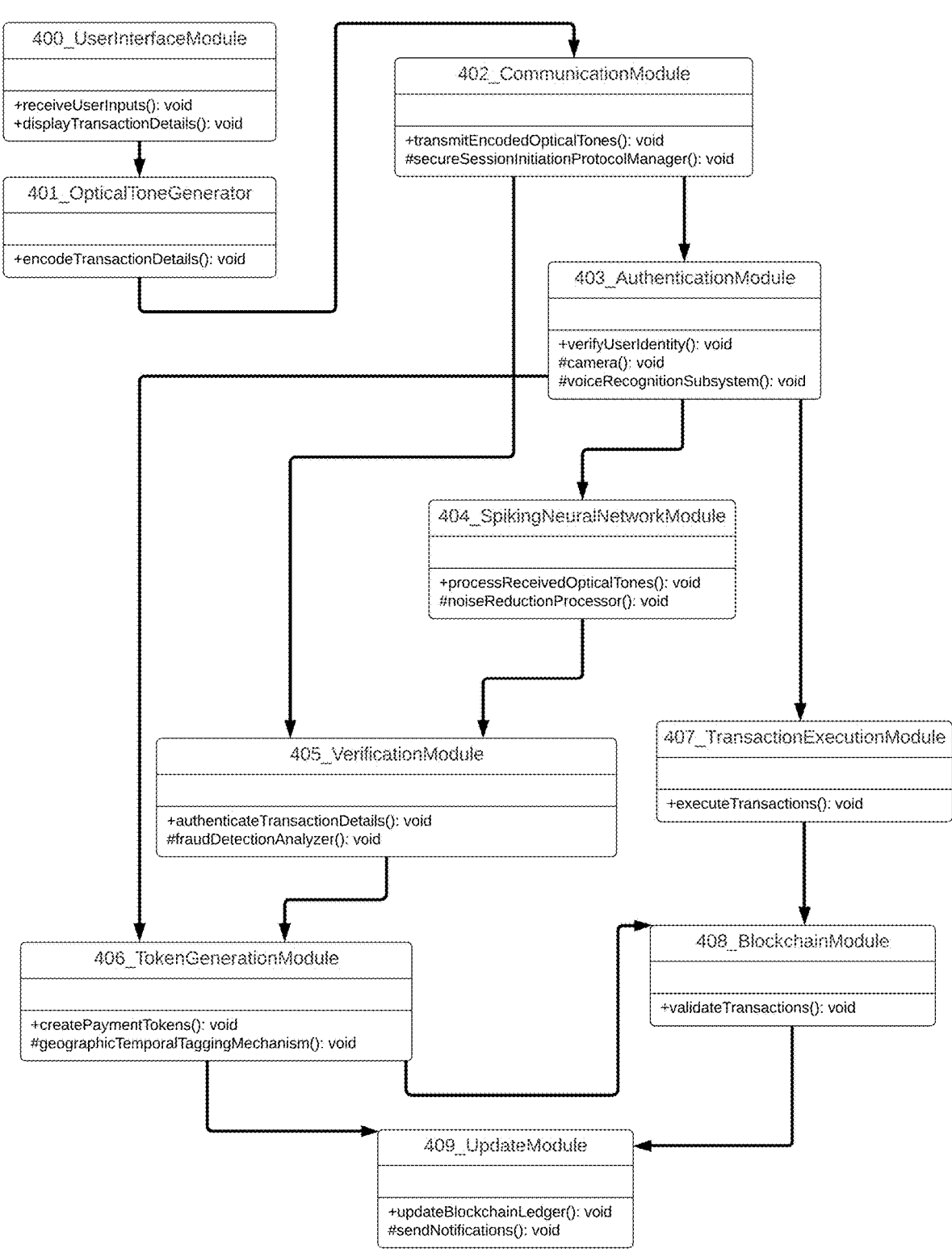
FIG. 4 depicts a sample class diagram for an information-security system for managing digital payment transactions in accordance with one or more aspects of this disclosure.

By way of non-limiting disclosure, FIG. 4 outlines the class diagram of a sample information-security system tailored for managing digital payment transactions. This diagram is structured to delineate the roles and responsibilities of various modules within the system, showcasing the intricate relationships and functionalities that enable secure and efficient digital transactions. Each module is designed to interact seamlessly within a comprehensive framework that emphasizes security, user verification, and transaction integrity.

FIG. 4 presents a class diagram of an information-security system designed for managing digital payment transactions, depicting various interconnected modules, each equipped with specific functions to ensure the transaction process is secure, efficient, and user-friendly.

At the user interface front, the 400_UserInterfaceModule operates critical functions such as receiveUserInputs( ) and displayTransactionDetails( ). This module handles interactions with the user, capturing inputs that detail transaction specifics like the payment amount and recipient information. It also enhances user engagement and security through visual and audible prompts, which are essential for confirming these inputs and preventing unauthorized transactions.

The 401_OpticalToneGenerator employs the encodeTransactionDetails( ) function to transform user-provided transaction details into unique optical tones. This module utilizes a specialized algorithm to encode each transaction attribute securely, ensuring the integrity of data like payment amounts or recipient identities.

For secure data communication, the 402_CommunicationModule features transmitEncodedOpticalTones( ) and includes a secureSessionInitiationProtocolManager( ). These functions establish a protected communication channel between the user's device and the payment system server, encrypting and securely transmitting data to safeguard against potential cyber threats.

User authentication is managed by the 403_AuthenticationModule, which utilizes verifyUserIdentity( ). This module includes a camera( ) for capturing facial features and a voiceRecognitionSubsystem( ) for processing voice commands, using convolutional neural networks to analyze biometric data and confirm the legitimacy of the user initiating the transaction.

Once the optical tone is received, the 404_SpikingNeuralNetworkModule processes the data through processReceivedOpticalTones( ), employing a noiseReductionProcessor( ) to enhance the clarity and accuracy of the extracted data, which allows for accurate verification in subsequent steps.

The 405_VerificationModule authenticates the transaction details through the authenticateTransactionDetails( ) function. It incorporates a fraudDetectionAnalyzer( ) to scrutinize the extracted data against known fraud indicators and predefined transaction rules, enhancing the system's security measures.

Upon successful verification, the 406_TokenGenerationModule generates a custom payment token using createPaymentTokens( ). This module enriches each token with precise transaction details, employing a geographicTemporalTaggingMechanism( ) to add timestamp and location data to each token, ensuring traceability and security for every transaction.

The actual transaction is executed by the 407_TransactionExecutionModule through executeTransactions( ), which manages the debits and credits between blockchain-linked accounts according to the transaction directives.

Transaction validation and recording are handled by the 408_BlockchainModule, which uses validateTransactions( ) to ensure all transactions adhere to blockchain protocols and rules, maintaining the integrity and immutability of records.

Finally, the 409_UpdateModule uses updateBlockchainLedger( ) to reflect the transaction outcomes in real-time in the blockchain ledger and employs sendNotifications( ) to inform users about the transaction status. This module provides detailed notifications that include transaction specifics and a cryptographic hash of the block containing the transaction, ensuring transparency and enhancing user confidence in the transaction process.

Overall, the class diagram effectively showcases how each module and its specific functions contribute to a secure, efficient, and user-friendly digital payment transaction system, emphasizing the interconnectivity and functionality needed to safeguard and streamline financial transactions.

Figure 5:
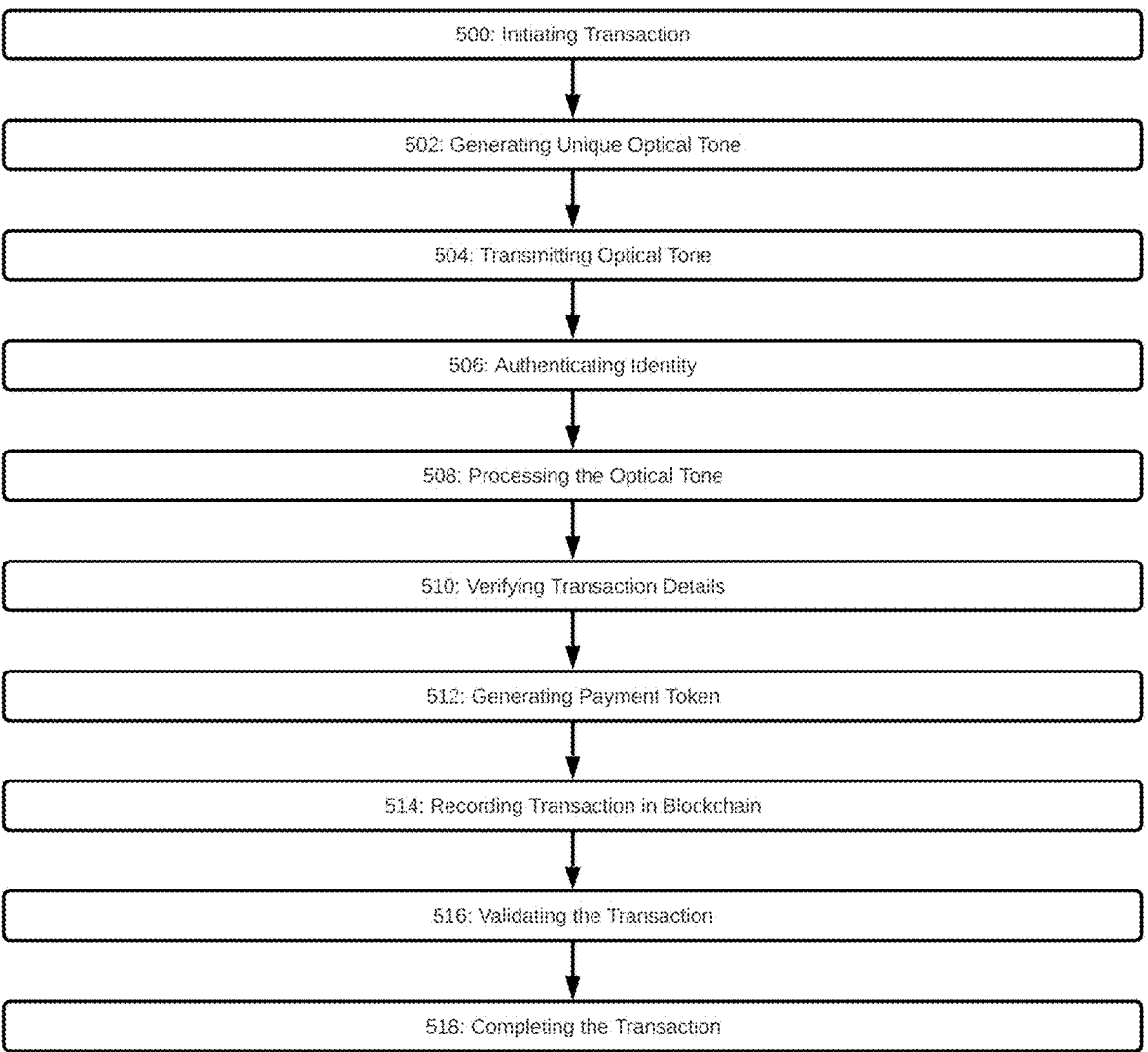
FIG. 5 depicts another sample flow diagram that integrates optical tones with blockchain technology and neuromorphic computing for secure and flexible transactions in accordance with one or more information security aspects of this disclosure.

FIG. 5 details a flowchart of a sample method used in an information-security system for managing digital payment transactions.

The process initiates at step 500, where the user starts the transaction by inputting critical details such as the payment amount and recipient information through their mobile or IoT device. This user initiation is pivotal as it triggers the subsequent automated security checks and transaction procedures.

Moving to step 502, the system generates a unique optical tone based on the transaction details provided. This tone is created using a specialized algorithm that encodes these details into a secure visual and/or audible format, making it suitable for secure transmission over digital networks.

At step 504, this optical tone is securely transmitted from the user's device to the payment system server. The transmission utilizes encrypted communication channels, ensuring the data's confidentiality and integrity are maintained as it moves from the user's device to the server.

Upon receipt, the system progresses to step 506, where the user's identity is authenticated. This step involves a multi-factor authentication system that includes facial recognition technology, where convolutional neural networks analyze the user's facial features captured in real-time. Additionally, a secondary authentication factor is also verified, which may involve inputting a security code or performing another biometric action different from facial recognition.

Step 508 involves processing the optical tone using a spiking neural network at the payment system server. This network is configured to filter out non-essential information and focus on extracting the critical transaction details needed for validation.

Once the essential data is extracted, the system moves to step 510 to verify the transaction details for authenticity and accuracy against a set of predefined security rules. This step is essential for detecting potential fraud or discrepancies that could compromise the transaction's security.

Step 512 sees the generation of a custom payment token based on the authenticated and verified transaction details. This token uniquely represents the transaction within a blockchain system, encapsulating all the verified details necessary for executing the transaction securely.

At step 514, the transaction and its corresponding custom payment token are recorded in a blockchain ledger. This recording ensures the transaction is immutably and securely documented, with critical details such as the transaction amount, recipient, and timestamp included.

The process then advances to step 516, where the transaction is validated through blockchain oracles. These oracles ensure the transaction complies with the blockchain network rules and the specific conditions encoded within the custom payment token, maintaining the transaction's integrity within the blockchain framework.

Finally, the transaction is completed at step 518 by updating the user's account in the blockchain ledger. This update includes deducting the specified amount and confirming the transaction's completion with a notification to the user's device, providing full transparency and finality to the transaction process.

FIG. 5, therefore, provides a comprehensive visual representation of the method used to ensure secure and efficient digital payment transactions, illustrating the seamless integration of advanced technology and robust security protocols from the initiation to the completion of a transaction.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

The invention claimed is:

1. An information-security method for managing digital payment transactions comprising the steps of:

receiving, via a user interface of a mobile or IoT device, a user input to initiate a transaction, wherein the user input specifies transaction details of a payment amount, a payment recipient, and a transaction context;

generating, in response to the user input, an optical tone by encoding the specified transaction details into a visual and audible representation, wherein the encoding employs a predetermined algorithm configured to convert the transaction details into a machine-readable optical tone format;

transmitting the generated optical tone from the mobile or IoT device to a payment system server over a digital network, wherein the transmitting includes securely sending the optical tone via encrypted communication channels;

authenticating, by the payment system server, the user of the mobile or IoT device based on a multi-factor authentication process, the process including:

verifying a biometric identifier of the user utilizing facial recognition technology implemented via convolutional neural networks that analyze facial features captured by the mobile or IoT device;

requesting and validating a secondary authentication factor comprising at least one of a password, a PIN, or a biometric input different from the facial recognition;

processing the generated optical tone using a spiking neural network to filter out irrelevant information from the optical tone and to extract transaction data, wherein the spiking neural network is configured to prioritize data elements for transaction validation;

verifying, by the payment system server, the authenticity and accuracy of the transaction details encoded in the optical tone by comparing the extracted transaction data against predefined transaction rules stored in a database;

creating, based on the transaction details, a custom payment token that uniquely represents the transaction, wherein creating the custom payment token involves associating the optical tone with specific transaction attributes including the payment amount, the payment recipient, and the transaction context;

recording the custom payment token in a blockchain ledger associated with the user account, wherein the blockchain ledger provides a decentralized, secure, and immutable record of the transaction and creation of the custom payment token is recorded as a new block in the blockchain, including cryptographic linking to preceding blocks;

executing the transaction based on the custom payment token through the payment system, wherein the execution includes deducting the payment amount from a blockchain-linked account and crediting it to the recipient's account;

validating the transaction post-execution using blockchain oracles that independently verify compliance of the transaction with predefined rules of the blockchain network; and updating, in real-time, the blockchain-linked account in the blockchain ledger to reflect completion of the transaction, wherein the update includes marking the custom payment token as utilized and recording a transaction outcome.

2. The information-security method of claim 1, further comprising the step of:

displaying, on the user interface of the mobile or IoT device, a confirmation prompt after generating the optical tone, wherein the confirmation prompt requires the user to verify or edit the transaction details before the optical tone is transmitted.

3. The information-security method of claim 2, wherein the transmitting includes employing a secure session initiation protocol (SIP) to establish a verified connection between the mobile or IoT device and the payment system server prior to transmitting the optical tone.

4. The information-security method of claim 3, wherein the biometric identifier for facial recognition is captured using a high-definition camera integrated into the mobile or IoT device, and the captured facial features are processed in real-time to generate a facial recognition template.

5. The information-security method of claim 4, wherein the secondary authentication factor includes receiving a voice command as a biometric input, which is analyzed using voice recognition algorithms to confirm the identity of the user.

6. The information-security method of claim 5, wherein the processing of the optical tone by the spiking neural network includes applying a noise reduction algorithm to enhance clarity and accuracy of the data extracted from the optical tone.

7. The information-security method of claim 6, wherein the verification of the transaction details includes checking the extracted data against a list of known fraud indicators stored on the payment system server, thereby enhancing fraud detection measures.

8. The information-security method of claim 7, wherein each optical tone generated is unique and is not reused for any other transaction, thereby providing enhanced security by preventing replication and reuse of the optical tones in fraudulent transactions.

9. The information-security method of claim 8, wherein the recording of the custom payment token in the blockchain ledger includes tagging the token with a timestamp and geographic location data from where the transaction was initiated.

10. The information-security method of claim 9, further comprising the step of:

notifying the user via the mobile or IoT device of successful recording and validation of the transaction in the blockchain ledger, wherein the notification includes details of the transaction and a cryptographic hash of the block containing the transaction record.

11. An information-security system for managing digital payment transactions, the system comprising:

a mobile or IoT device comprising:

a mobile or IoT device user interface;

a mobile or IoT device processor; and a mobile or IoT device memory storing a mobile or IoT device computer readable instructions that when executed by the mobile or IoT device processor causes the mobile or IoT device processor to perform the steps of:

receiving, via the user interface, user inputs and display transaction details;

encoding, using an optical tone generator software, the transaction details into optical tones, wherein each optical tone represents a unique transaction attribute such as payment amount, recipient, and context; and securely transmitting, via a communication software, the encoded optical tones to a payment system server via encrypted communication channels;

the system further comprising the payment system server comprising:

a server processor; and a server memory storing a server computer readable instructions that when executed by the server processor causes the server processor to perform the steps of:

verifying a biometric identifier of the user utilizing facial recognition technology implemented via convolutional neural networks that analyze facial features captured by the mobile or IoT device;

processing, using a spiking neural network, the received optical tones by filtering out irrelevant information and extracting transaction data;

authenticating, using a verification software, the transaction details encoded in the optical tone by comparing the extracted data against predefined transaction rules;

creating, using a token generation software, custom payment tokens based on the verified transaction details, where each token is recorded in a blockchain ledger for secure and immutable transaction recording;

executing, using a transaction execution software, the verified transactions based on the custom payment tokens and update the user's blockchain-linked account;

validating, using a blockchain software, the verified transaction by verifying compliance with predefined blockchain rules; and updating, using an updating software, the blockchain ledger in real-time to reflect the transaction outcome, including marking tokens as utilized.

12. The information-security system of claim 11, wherein the user interface is further configured to provide a visual and audible confirmation prompt requiring user verification of transaction details before the optical tone is transmitted.

13. The information-security system of claim 12, wherein the communication software further comprises a secure session initiation protocol manager to establish a verified connection between the mobile or IoT device and the payment system server.

14. The information-security system of claim 13, wherein the authentication further includes a high-definition camera to capture facial features for facial recognition and a voice recognition subsystem to receive and analyze voice commands as part of the multi-factor authentication process.

15. The information-security system of claim 14, wherein the spiking neural network includes a noise reduction processor to enhance the clarity and accuracy of the data extracted from optical tones.

16. The information-security system of claim 15, wherein the verification software includes a fraud detection analyzer configured to check the extracted data against a list of known fraud indicators to enhance security measures.

17. The information-security system of claim 16, wherein the optical tone generator software is configured to ensure each optical tone generated is unique and not reused, thereby enhancing transaction security by preventing optical tone replication and misuse.

18. The information-security system of claim 17, wherein the token generation software includes a geographic and temporal tagging mechanism that tags each custom payment token with a timestamp and geographic location data from where the transaction was initiated.

19. The information-security system of claim 18, wherein the update software is further configured to send notifications to the user's mobile or IoT device upon successful transaction completion, including transaction details and a cryptographic hash of the block containing the transaction.

20. A method for enhancing security and efficiency in digital payment transactions, comprising the steps of:

initiating a transaction by a user via a user device, wherein the user inputs transaction details including payment amount and recipient information;

generating a unique optical tone that encodes the transaction details, wherein the optical tone is generated using a specialized algorithm that translates the transaction details into a secure visual and audible format;

transmitting the generated optical tone from the user device to a payment system server over a secure, encrypted communication channel;

authenticating identity of the user initiating the transaction using a multi-factor authentication system that includes:

facial recognition via convolutional neural networks that analyze the user's facial features captured in real-time;

a secondary authentication factor that involves inputting a security code or performing a biometric action different from facial recognition;

processing the optical tone at the payment system server using a spiking neural network configured to extract transaction details by filtering out non-essential information and focusing on data critical for transaction validation;

verifying the extracted transaction details for authenticity and accuracy against a set of predefined security rules to detect potential problems;

generating a custom payment token based on the authenticated and verified transaction details, wherein the custom payment token uniquely represents the transaction within a blockchain system;

recording the transaction and the custom payment token in a blockchain ledger, ensuring the transaction is immutably and securely documented, with details including the transaction amount, recipient, and timestamp;

validating the transaction through blockchain oracles that ensure compliance of the transaction with blockchain network rules; and completing the transaction by updating the user's account in the blockchain ledger, deducting the payment amount, and confirming the transaction completion with a notification to the user's device.

5

\* \* \* \* \*